United States Patent [19]

Maruyama

[11] Patent Number: 5,391,680
[45] Date of Patent: Feb. 21, 1995

[54] ODOR RESISTANT FILM-FORMING COMPOSITION

[75] Inventor: Teruhito Maruyama, Kanagawa, Japan

[73] Assignee: Dow Corning Asia, Ltd., Tokyo, Japan

[21] Appl. No.: 174,970

[22] Filed: Dec. 29, 1993

[30] Foreign Application Priority Data

Jan. 6, 1993 [JP] Japan .................. 5-015848

[51] Int. Cl.$^6$ .................................. C08G 77/26
[52] U.S. Cl. ............................ 528/38; 528/33; 528/34; 427/387
[58] Field of Search ............... 528/38, 33, 34; 427/387

[56] References Cited

U.S. PATENT DOCUMENTS 4,760,123  7/1988  Imai et al. ..................... 528/18

*Primary Examiner*—Melvyn I. Marquis
*Attorney, Agent, or Firm*—James L. DeCesare

[57] ABSTRACT

An odor-resistant film-forming composition capable of preventing the migration and lingering of odors onto substrates, which contains a first type of silicon compound with an amino group and a plurality of hydrolyzable groups in the molecule and a second type of silicon compound without an amino group but with a plurality of hydrolyzable groups in the molecule, wherein at least one of the first type of silicon compound and second type of silicon compound includes a silicon compound which has 3 or more hydrolyzable groups in the molecule. The proportion of Weight A of the silicon compound of either the first type of silicon compound or second type of silicon compound having two hydrolyzable groups in the molecule comprises 20-90% of the total of the Weight A and Weight B of the silicon compound(s) having 3 or more hydrolyzable groups in the molecule, the proportion of Weight C of the first type of silicon compound is 20-90% of the total of the Weight C and Weight D of the second type of silicon compound; and the second type of silicon compound includes at least one type selected from a group consisting of specified compounds.

5 Claims, No Drawings

ODOR RESISTANT FILM-FORMING COMPOSITION

FIELD OF THE INVENTION

The present invention relates to an odor resistant film-forming composition which forms an odor resistant film which is suitable for use on the surfaces of materials onto which it is desired to prevent the migration or lingering of odors, and which prevents the migration of odors onto such materials even when odorous substances are in direct or indirect contact therewith.

In the normal living environment, a great number of odorous substances are present. For example, various foods, grasses, trees, animals, and other organic substances, either directly or upon their decay, produce odorous substances such as propionic acid, valeric acid, isovaleric acid, butyric acid, and other organic acids, which create odors. However, when such odorous substances come into contact with objects either directly or indirectly, the odors seep into the internal structure thereof becoming "fixed", and in many cases sufficient deodorization is impossible by normal washing with water or even with an alkali.

In light of the above circumstances, it has been strongly desired to prevent the migration or lingering of odors onto most objects. For example, it had been desired to prevent the migration or lingering of odors resulting from direct or indirect contact of odorous substances with containers for odor-producing substances, containers for materials which generate odors by the decay or degeneration of perishable foods and the like, wall materials for partitioning rooms which are filled with odors, or objects which are stationed in such rooms. This is also very desirable considering that the adequate prevention of migration or lingering of such odors onto, for example, containers will also eliminate later remigration of those odors to the substances which are to be kept in the containers.

An odor-resistant film-forming composition according to the present invention is used on a substrate for which the prevention of migration or lingering of odors is desirable, and is applied to the surface of the substrate to form an odor-resistant film. Here, "odor-resistant film" refers to a film possessing properties such that it coats the surface of the substrate to prevent the migration or lingering of odors onto it, while the odors which migrate or linger onto the film itself may be easily removed, thus restoring and maintaining the odor-eliminating and preventing properties of the film.

DESCRIPTION OF THE PRIOR ART

Conventionally, methods are known for applying so-called odor preventing or odor-eliminating agents beforehand to various types of objects as a means of preventing the migration or lingering of odors onto those objects. For example, in Japanese Patent Application Disclosure SHO 63-168171 and Japanese Patent Application Disclosure HEI 2-80051 there are disclosed processes for odor prevention treatment in which odor-eliminating agents or the like are impregnated, coated or adhered onto fiber products.

Nevertheless, in such processes for odor prevention treatment according to the prior art, the odor-eliminating or preventing properties are not long-lasting, and when, for example, washing with water is effected, the odor-eliminating or preventing properties are considerably reduced or lost altogether, requiring repetition of the odor prevention treatment.

SUMMARY OF THE INVENTION

The object of the present invention is to provide an odor-resistant film-forming composition with excellent odor-eliminating and odor-preventing properties, which forms a satisfactory film when applied to a substrate, thus preventing the migration or lingering of odors onto the substrate, and the film may be washed with water for easy removal of odors which have migrated onto the film itself.

DETAILED DESCRIPTION OF THE INVENTION

An odor-resistant film-forming composition according to the present invention is characterized by:

containing a first type of silicon compound with an amino group and a plurality of hydrolyzable groups in the molecule, and a second type of silicon compound without an amino group but with a plurality of hydrolyzable groups in the molecule;

wherein at least one of the above mentioned first type of silicon compound and second type of silicon compound includes a silicon compound which has 3 or more hydrolyzable groups in the molecule;

the proportion of the silicon compound of either the first type of silicon compound or second type of silicon compound having two hydrolyzable groups in the molecule comprises 20-90% of the total of the silicon compound(s) having 3 or more hydrolyzable groups in the molecule; and the second type of silicon compound comprises at least one type selected from the group consisting of compounds (a)–(e) below.

(a) A polydiorganosiloxane having a plurality of hydrolyzable groups in the molecule.

(b) A siloxane resin containing an $R^0_{(3-m)}R^1_mSiO_{\frac{1}{2}}$ unit (wherein m represents 1, 2 or 3), an $R^0_{(2-n)}R^1_nSiO_{2/2}$ unit (wherein n represents 1 or 2), and an $R^0_{(1-p)}R^1_pSiO_{3/2}$ unit (wherein p represents 0 or 1), (provided that $R^0$ is a hydrolyzable group, $R^1$ is a methyl or phenyl group, and the siloxane resin has a plurality of hydrolyzable groups in the molecule).

(c) An organic silicone compound represented by the formula $R^2_aSiX_{4-a}$ (wherein $R^2$ is a saturated or unsaturated monovalent hydrocarbon of 1–5 carbon atoms, X is a hydrolyzable group, and a is 2 or 3).

(d) A partially hydrolyzed condensation product of the organic silicone compound in (c) above; and (e) A silicate or its partially hydrolyzed condensation product.

The above mentioned first type of silicon compound preferably includes at least one type selected from the group consisting of γ-(2-aminoethyl)aminopropyltrimethoxysilane, γ-(2-aminoethyl)aminopropylmethyldimethyoxysilane, 3-aminopropyltriethoxysilane, and N-[(3-trimethoxysilyl) propyl]diethylenetriamine.

A concrete explanation of the present invention is provided below.

According to the present invention, an odor-resistant film-forming composition comprises, as essential components thereof, a first type of silicon compound with an amino group and a plurality of hydrolyzable groups in the molecule, and a second type of silicon compound without an amino group but with a plurality of hydrolyzable groups in the molecule. Here, at least one of the first type of silicon compound and second type of silicon compound includes a silicon compound with 3 or more hydrolyzable groups in the molecule.

The first type of silicon compound according to the present invention contains one or more of any of a first amino group, a second amino group or a third amino group in the molecule, and includes a silane compound or polysiloxane which has 2 or more hydrolyzable groups in the molecule. The first type of silicon compound to be used may be of only one type, or of 2 or more types.

Here, the "hydrolyzable group" refers to a hydroxyl group, an alkoxy group such as a methoxy, propoxy or butoxy group, etc., or a halogen atom, etc., and it is preferably a hydroxyl group or alkoxy group.

Included in the definition of this first type of silicon compound are compounds represented by the following Formulas 1, 2 and 3.

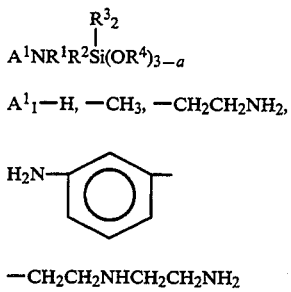

[Formula 1]

$A^1NR^1R^2Si(OR^4)_{3-a}$ $A^1_1$—H, —CH$_3$, —CH$_2$CH$_2$NH$_2$,

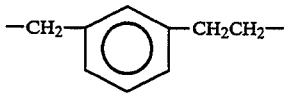

—CH$_2$CH$_2$NHCH$_2$CH$_2$NH$_2$

R$^1$: —H, allyl group, or alkyl group of 1–4 carbon atoms

R$^2$: Alkylene group of 3–4 carbon atoms, or

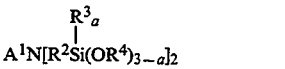

R$^3$: Alkyl group of 1–4 carbon atoms

R$^4$: Alkyl group of 1–4 carbon atoms, —SiCH$_3$, or —H a: Integer of 0, 1 or 2

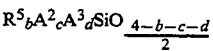

[Formula 2]

$A^1N[R^2Si(OR^4)_{3-a}]_2$ wherein A$^1$, R$^2$, R$^3$, R$^4$ and a are the same as in Formula 1.

$R^5{}_bA^2{}_cA^3{}_dSiO_{\frac{4-b-c-d}{2}}$ [Formula 3]

R$^5$: Unsubstituted or substituted monovalent hydrocarbon with no amino group

A$^2$: —R$^6$(NHCH$_2$CH$_2$)$_2$NHR$^7$ (R$^6$: Alkylene group of 3–4 carbon atoms R$^7$: —H or alkyl group of 1–4 carbon atoms)

A$^3$: —OH, alkoxy group

Average value ranges for b, c and d:

$1.90 < b < 2.5$ $0.01 \leq c \leq 1$ $0 \leq d \leq 0.1$ (provided that $1.90 \leq b+c+d \leq 3$)

e: $0 \leq e \leq 3$ (provided that e is an integer)

According to the present invention, of the compounds represented by the above Formula 1, the amino group-containing silicon compounds represented by the following Formulas (a), (b) and (c) are preferred as the first type of silicon compound.

Formula (a)
H$_2$N(CH$_2$)$_2$NH(CH$_2$)$_9$SiR$^a{}_m$(OR$^b$)$_n$

Formula (b)
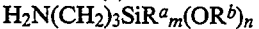
H$_2$N(CH$_2$)$_3$SiR$^a{}_m$(OR$^b$)$_n$

Formula (c)
H$_2$N(CH$_2$CH$_2$NH)$_2$Si(OR$^b$)$_3$ wherein R$^a$ is an alkyl group of 1–4 carbon atoms, R$^b$ is —CH$_3$ or —C$_2$H$_5$, m is an integer 0 or 1 and n is an integer 2 or 3, the sum of m and n being 3.

Concrete examples of compounds which may be used as the first type of silicon compound according to the present invention include, but are not restricted to, the following. 3-[N-allyl-N-(2-aminoethyl)]aminopropyltrimethyoxysilane N-(2-aminoethyl)-3-aminopropylmethyldimethoxysilane 3-aminopropyltriethoxysilane N-3-trimethoxysilylpropyl-m-phenylenediamine N-[(3-trimethoxysilyl)propyl] diethylenetriamine p-[N-(2-aminoethyl)aminomethyl] phenethyltrimethoxysilane N-(2-aminoethyl)-3-aminopropyltrimethoxysilane N,N-bis[3-(methyldimethoxysilyl) propyl]ethylenediamine γ-(2-aminoethyl)aminopropyltrimethoxysilane γ-(2-aminoethyl)aminopropylmethyldimethoxysilane.

Of these are particularly preferred for use γ-(2-aminoethyl) aminopropyltrimethoxysilane, γ-(2-aminoethyl) aminopropylmethyldimethoxysilane, N-(2-aminoethyl)-3-aminopropyltrimethoxysilane and 3-aminopropyltriethoxysilane.

The second type of silicon compound according to the present invention comprises silicon compounds without an amino group but with 2 or more hydrolyzable groups in the molecule, and at least one or more selected from the group consisting of (a)–(e) below may be used.

(a) A polydiorganosiloxane having a plurality of hydrolyzable groups in the molecule.

(b) A siloxane resin containing an R$^0{}_{(3-m)}$R$^1{}_m$SiO$_{\frac{1}{2}}$ unit (wherein m represents 1, 2 or 3), an R$^0{}_{(2-n)}$R$^1{}_n$SiO$_{2/2}$ unit (wherein n represents 1, 2 or 3), and an R$^0{}_{(1-p)}$R$^1{}_p$SiO$_{3/2}$ unit (wherein p represents 0 or 1), (provided that R$^0$ is a hydrolyzable group, R$^1$ is a methyl or phenyl group, and the siloxane resin has a plurality or hydrolyzable groups in the molecule).

(c) An organic silicone resin represented by the formula R$^2{}_a$SiX$_{4-a}$ (wherein R$^2$ is a saturated or unsaturated monovalent hydrocarbon of 1–5 carbon atoms, X is a hydrolyzable group, and a is 2 or 3).

(d) A partially hydrolyzed condensation product of the organic silicone compound in (c) above; and (e) A silicate or its partially hydrolyzed condensation product.

Concrete examples of the second type of silicon compound to be used according to the present invention include, for example, a polydimethylsiloxane both ends of which are terminated with hydroxyl groups (preferably a silicone oil with 3–18 repeating siloxane units), a methoxy group-containing methyl silicone resin, a methoxy group-containing methylphenyl silicone resin, a silanol group-containing methyl silicone resin, a silanol group-containing methylphenyl silicone resin, ethyl silicate, n-propyl orthosilicate, dialkyldimethoxysilane, alkyltrimethoxysilane, etc.

According to the present invention, an odor-resistant film-forming composition comprises, as essential components thereof, a first type of silicon compound and a second type of silicon compound, and at least one of the first type of silicon compound and second type of silicon compound must be a silicon compound having at least 3 or more hydrolyzable groups in the molecule.

Concrete embodiments of suitable combinations for the odor-resistant film-forming composition according to the present invention are illustrated below.

Embodiment 1

γ-(2-aminoethyl)aminopropyltrimethoxysilane
Methoxy group-containing methyl silicone resin
Silicone oil having both ends terminated with OH

Embodiment 2

γ-(2-aminoethyl)aminopropylmethyldimethyoxysilane
Methoxy group-containing methyl silicone resin
Silicone oil having both ends terminated with OH

Embodiment 3

γ-(2-aminoethyl)aminopropyltrimethoxysilane
γ-(2-aminoethyl)aminopropylmethyldimethyoxysilane
Methoxy group-containing methyl silicone resin
Silicone oil having both ends terminated with OH

Embodiment 4

γ-(2-aminoethyl)aminopropyltrimethoxysilane
γ-(2-aminoethyl)aminopropylmethyldimethyoxysilane
Methoxy group-containing methyl silicone resin
Methoxy group-containing phenylmethyl silicone resin
Silicone oil having both ends terminated with OH

Embodiment 5

γ-(2-aminoethyl)aminopropyltrimethoxysilane
γ-(2-aminoethyl)aminopropylmethyldimethyoxysilane
Methoxy group-containing methyl silicone resin
Dimethyldimethoxysilane
Silicone oil having both ends terminated with OH

Embodiment 6

γ-(2-aminoethyl)aminopropyltrimethoxysilane
γ-(2-aminoethyl)aminopropylmethyldimethyoxysilane
Methoxy group-containing methyl silicone resin
Silicate
Silicone oil having both ends terminated with OH

Embodiment 7

γ-(2-aminoethyl)aminopropyltrimethoxysilane
Dimethyldimethoxysilane

Embodiment 8

γ-(2-aminoethyl)aminopropyltrimethoxysilane
γ-(2-aminoethyl)aminopropylmethyldimethyoxysilane
Dimethyldimethoxysilane

Embodiment 9

γ-(2-aminoethyl)aminopropyltrimethoxysilane
γ-(2-aminoethyl)aminopropylmethyldimethyoxysilane
Methoxy group-containing methyl silicone resin

Embodiment 10

N-[(3-trimethoxysilyl)propyl]diethylenetriamine
Methoxy group-containing methyl silicone resin
Silicone oil having both ends terminated with OH

Embodiment 11

N-[(3-trimethoxysilyl)propyl]diethylenetriamine
γ-(2-aminoethyl)aminopropylmethyldimethyoxysilane
Methoxy group-containing methyl silicone resin
Silicone oil having both ends terminated with OH

Embodiment 12

3-aminopropyltriethoxysilane
Methoxy group-containing methyl silicone resin
Silicone oil having both ends terminated with OH

Embodiment 13

3-aminopropyltriethoxysilane
γ-(2-aminoethyl)aminopropylmethyldimethyoxysilane
Methoxy group-containing methyl silicone resin
Silicone oil having both ends terminated with OH

Embodiment 14

γ-(2-aminoethyl)aminopropylmethyldimethyoxysilane
Methyltrimethoxysilane
Dimethyldimethoxysilane

Embodiment 15

γ-(2-aminoethyl)aminopropyltrimethoxysilane
γ-(2-aminoethyl)aminopropylmethyldimethyoxysilane
Methyltrimethoxysilane
Dimethyldimethoxysilane

Embodiment 16

γ-(2-aminoethyl)aminopropylmethyldimethyoxysilane
Methyltrimethoxysilane
Silicone oil having both ends terminated with OH

Embodiment 17

γ-(2-aminoethyl)aminopropyltrimethoxysilane
γ-(2-aminoethyl)aminopropylmethyldimethyoxysilane
Methyltrimethoxysilane
Silicone oil having both ends terminated with OH

Embodiment 18

γ-(2-aminoethyl)aminopropyltrimethoxysilane
γ-(2-aminoethyl)aminopropylmethyldimethyoxysilane
Methyltrimethoxysilane
Silicone oil having both ends terminated with OH
Methoxy group-containing methyl silicone resin
Dimethylmethoxysilane

Embodiment 19

γ-(2-aminoethyl)aminopropyltrimethoxysilane
Silicone oil having both ends terminated with OH
Silicate The odor-resistant film-forming composition according to the present invention must contain the above mentioned first type of silicon compound and second type of silicon compound at a proportion which satisfies the following Conditions 1 and 2.

Condition 1

Concerning the first type of silicon compound and second type of silicon compound, defining the weight of the silicon compounds having two hydrolyzable groups in the molecule as A, and the silicon compound having 3 or more hydrolyzable groups in the molecule as B, the proportion α of A with respect to the total (A+B) (α=A/(A+B)) is 20–90%.

Condition 2

Defining the weight of the first type of silicon compound as C and the weight of the second type of silicon compound as D, the proportion $\beta$ of C with respect to their total (C+D) ($\beta = C/(C+D)$) is 20–90%.

Furthermore, the above mentioned proportion $\alpha$ is preferably 30–80%, and the proportion $\beta$ is preferably 30–80%. In addition, it is particularly preferred that $\alpha$ and $\beta$ both be within these ranges, and even more preferably, $\alpha$ is 30–80% and $\beta$ is 50–80%.

Regarding the first type of silicon compound and the second type of silicon compound, if the proportion $\alpha$ is too small, then it will be impossible to obtain a film with sufficient strength, while if it is too large, then cracking will tend to occur complicating the forming of the film.

Also, if the proportion $\beta$ is too small, then it will be impossible to achieve a sufficient odor-resistant effect, while if it is too large, then cracking will tend to occur complicating the forming of the film.

If necessary, additives may be appropriately added to the odor-resistant film-forming composition according to the present invention.

Representative of such additives are curing accelerator catalysts, and they may be incorporated in the composition to shorten the time required for the curing of the applied film of the composition. As such curing accelerator catalysts are preferred organic copper catalysts, organic lead catalysts, and the like, and concrete examples thereof include, for example, dibutyltin diacetate, dibutyltin dilaurate, etc. The proportion of such curing accelerator catalysts to be incorporated in the composition is preferably, for example, 2.0 wt % or less.

In addition, aromatics, coloring agents, mildew-resistant agents, viscosity regulators and other additives may be used if necessary.

The odor-resistant film-forming composition according to the present invention is preferably in the form of a liquid, for practical use. To obtain a suitable liquid form, an appropriate solvent may be used, and particularly preferred is an alcoholic solvent or aromatic solvent.

Furthermore, in order to improve the wettability of the composition for the substrate, a suitable surfactant may be added thereto. In this case, a fluorochemical surfactant is particularly preferred, and it is preferably added at a proportion of 0.5 wt % or less of the total composition.

The composition according to the present invention may be easily prepared by mixing all of the components of the composition at one time, but they may also be mixed together in succession, in which case there is usually no particular restriction on the order of mixing.

The odor-resistant film-forming composition according to the present invention is used by being applied, by an appropriate means, to the surfaces of substrates made of materials onto which it is desired to prevent the migration or lingering of odors, to form an odor resistant film. In order to achieve a suitable application performance, the odor-resistant film-forming composition may also be diluted using an appropriate organic solvent. The method of application to be use may be spraying, brush coating, roll coating, dipping, etc.

The material of the substrate for application of the odor-resistant film-forming composition according to the present invention is not particularly restricted, and materials made of a variety of substances, including rubber, plastic, sealants, wood, fiber, inorganic materials, etc. may be used as substrates. Also, the composition is particularly effective for use on materials into which odor-causing substances penetrate from the surface into the interior becoming fixed, which makes adequate removal of the odor impossible by normal washing of the surface with water.

A film formed by the use of the odor-resistant film-forming composition according to the present invention is curable as a result of the action of the hydrolyzable groups contained as components thereof. Consequently, the applied film may be cured by allowing it to stand at room temperature, although heating is actually preferred, and the curing may be accelerated by thermal treatment at a temperature of 150° C. or lower for 10 minutes or less. Further, as described before, a curing accelerator catalyst may be used to alleviate the conditions of curing The odor-resistant film-forming composition according to the present invention is used to form a film by binding together a first type of silicon compound with an amino group and a plurality of hydrolyzable groups in the molecule, and a second type of silicon compound without an amino group but with a plurality of hydrolyzable groups in the molecule, and the film itself is odor-eliminating and odor-preventing, also preventing the penetration of odors, and therefore by its application onto the surface of a substrate, the migration and lingering of odors onto the substrate are adequately prevented.

Furthermore, the film provides favorable odor resistance. That is, when odorous substances come into direct or indirect contact therewith, the odor migrates or lingers onto the film itself, but may be very easily removed by washing with water, while the odor-eliminating and odor-preventing effect is maintained even after the washing with water, and an excellent film strength is provided. Therefore, since odors may be removed by appropriate washing with water to restore the odor-eliminating and odor-preventing properties thereof, repeated treatment to impart the odor-eliminating and odor-preventing properties is unnecessary.

In addition, the components used in the odor-resistant film-forming composition according to the present invention are all easily obtainable, making it very advantageous.

EXAMPLES

Examples according to the present invention are explained below, but the present invention is not limited to these Examples.

The first type of silicon compound to be used according to the present invention includes those listed as Components 1–4 below.

Component 1: γ-(2-aminoethyl)aminopropyltrimethoxysilane $NH_2CH_2CH_2NHCH_2CH_2CH_2Si(OSH_2)_3$

Component 2: γ-(2-aminoethyl)aminopropylmethyldimethyoxysilane $NH_2CH_2CH_2NHCH_2CH_2CH_2Si(OCH_3)_2CH_3$

Component 3: 3-aminopropyltriethoxysilane $NH_2CH_2CH_2CH_2Si(OC_2H_5)_3$

Component 4: N-[(3-trimethoxysilyl)propyl]diethylenetriamine $H_2N(CH_2CH_2NH)_2Si(OCH_3)_3$ The second type of silicon compound to be used according to the present invention includes those listed as Components 5–13 below.

Component 5: Silanol group-containing methyl silicone resin (diluted to 50% with toluene, viscosity: 15 cp)

Component 6: Methoxy group-containing methyl silicone resin (Nonvolatile matter: 100%, viscosity: 25 cp)

Component 7: Methoxy group-containing phenylmethyl silicone resin (Nonvolatile matter: 100%, viscosity: 15 cp)

Component 8: Methyltrimethoxysilane $CH_3Si(OCH_3)_3$

Component 9: Dimethyldimethoxysilane $(CH_3)_2Si(OCH_3)_2$

Component 10: Tetraethyl silicate $Si(OC_2H_5)_4$

Component 11: Silicate having the structure shown in the following Formula 4, with a $SiO_2$ content of 40.0–41.0 wt %.

$$\begin{array}{c} OC_2H_5 \\ | \\ (C_2H_5O)_3Si(OSi)_nOC_2H_5 \\ | \\ OC_2H_5 \end{array} \quad \text{Formula 4}$$

(n = 0, 1, 2, ..., n)

Component 12: Silicate having the same structure as Formula 4 above, with a $SiO_2$ content of about 45 wt %.

Component 13: A silicon oil represented by the following Formula 5.

$$\begin{array}{c} CH_3 \; CH_3 \\ | \quad | \\ HO(SiO)_nSi-OH \\ | \quad | \\ CH_3 \; CH_3 \end{array} \quad \text{Formula 5}$$

(3 ≦ n ≦ 50)

The additive to be used according to the present invention is selected from those listed as Components 14–15 below.

Component 14: Catalyst Dibutyltin diacetate
Component 15: Surfactant Flowrad FC-430 (product of Sumitomo 3M)

The solvent used in the Examples is the one listed as Component 16 below.

Component 16: Solvent Isopropyl alcohol

EXAMPLE 1

Components 1 and 2 were used as the first type of silicon compounds, Components 5, 8, 9 and 13 were used as the second type of silicon compounds, and Component 16 was used as the solvent.

The components were combined at various proportions to prepare odor resistant film-forming compositions 1A–1K. The proportions of each of the components are listed in Table 1.

In Table 1, "+" used in the column "Amino group" indicates that the compound was a first type of silicon compound, while "−" indicates that the compound was a second type of silicon compound.

The numbers shown in the column "HYD" indicate the number of hydrolyzable groups contained in the molecule of the silicon compound, and "3*" indicates inclusion of 3 or more hydrolyzable groups.

The total of the parts by weight of the first type of silicon compound and second type of silicon compound for each composition is 100.

The above comments also apply to Tables 2–7 relating to the following Examples.

EXAMPLE 2

Components 1 and 2 were used as the first type of silicon compounds, Components 5–13 were used as the second type of silicon compounds, and further Components 14 and 15 were used as the additives and Component 16 as the solvent.

The components were combined at various proportions to prepare odor resistant film-forming compositions 2A–2I. The proportions of each of the components are listed in Table 2.

Example 3

Components 1 and 2 were used as the first type of silicon compounds, Components 5 and 13 were used as the second type of silicon compounds, and further Components 14 and 15 were used as additives and Component 16 as the solvent.

The components were combined at various proportions to prepare odor resistant film-forming compositions 3A–3M. The proportions of each of the components are listed in Table 3.

EXAMPLE 4

Components 1 and 2 were used as the first type of silicon compounds, Components 5 and 9 were used as the second type of silicon compounds, and further Components 14 and 15 were used as the additives and Component 16 as the solvent.

The components were combined at various proportions to prepare odor resistant film-forming compositions 4A–4F. The proportions of each of the components are listed in Table 4.

EXAMPLE 5

Components 1 and 2 were used as the first type of silicon compounds, Component 5 was used as the second type of silicon compound, and further Components 14 and 15 were used as the additives and Component 16 as the solvent.

The components were combined at various proportions to prepare odor resistant film-forming compositions 5A–5D. The proportions of each of the components are listed in Table 5.

EXAMPLE 6

Components 1–4 were used as the first type of silicon compounds, Components 6 and 13 were used as the second type of silicon compounds, and further Components 14 and 15 were used as the additives and Component 16 as the solvent.

The components were combined at various proportions to prepare odor resistant film-forming compositions 6A–6D. The proportions of each of the components are listed in Table 6.

Comparison 1

Components 1 and 2 were used as the first type of silicon compounds, Components 5, 9 and 13 were used as the second type of silicon compounds, and further Components 14 and 15 were used as additives and Component 16 as the solvent.

The components were combined at various proportions to prepare odor resistant film-forming compositions 7A–7H. The proportions of each of the components are listed in Table 7.

Evaluation

As the substrate for application of the above mentioned compositions was used a silicon rubber sealant which had been applied onto a glass slide over an area of 5×50 mm, and was then allowed to stand at room temperature for 7 days for curing.

One gram each of the odor-resistant film-forming compositions obtained in Examples 1–6 and Comparison 1 above was evenly applied to the surface of the sealant substrate, and these were allowed to stand at 25° C. for one day for curing to prepare the samples.

Each of the obtained samples, as well as a control sample consisting of a substrate to which no composition had been applied, were placed in a 200 milliliter sealable container which contained propionic acid, in such a manner that they did not come into direct contact with the propionic acid, and they were allowed to stand at 25° C. for 3 days. When each of the samples was taken out thereafter, it was found that the samples obtained in the Examples clearly had a lower degree of odor than did the control sample. In addition, all of the samples, except for the control sample, were subjected to a process in which they were washed with running tap water for 5 minutes, after which determination was made of the condition of the film and of the degree of residual odor by smelling. The results thereof, together with the conditions of the films, are shown in Tables 1–7.

In the tables, the "Film" column shows the condition of the film, with the symbol "o" indicating that the film had formed evenly after application and curing of the composition on the substrate, and the symbol "X" indicating that no film had formed.

Likewise, the "Odor" column indicates the results of the 6-level odor strength test of the degree of residual odor, determined by smelling. For this test, the odor strength was classified into 6 levels, with an odor strength of "0" indicating no perception of odor, "1" indicating a slight perception of odor, "2" indicating a weak perception of odor which allowed the odor to be distinguished from other odors, "3" indicating an easily perceived odor, "4" indicating the perception of a strong odor, and "5" indicating the perception of an intense odor.

In Tables 1–7, the symbol "o" in the "Odor" column indicates an odor strength of 0–2, and the symbol "X" indicates an odor strength of 3–5.

As is clear from the results shown in Tables 1–7, by combining a first type of silicon compound and a second type of silicon compound in such a manner as to satisfy the above Conditions 1 and 2, it is possible to obtain an odor-resistant film-forming composition which forms a good film and has excellent odor-preventing properties.

TABLE 1

| | | Component | | | | | | Solvent | Film | Odor | $\alpha$ (%) | $\beta$ (%) |
|---|---|---|---|---|---|---|---|---|---|---|---|---|
| | | 1 | 2 | 5 | 8 | 13 | 9 | 16 | | | | |
| Amino group | | + | + | − | − | − | − | | o | o | | |
| HVD | | 3 | 2 | 3* | 3* | 2 | 2 | | o | o | | |
| COMP- | 1A | | 50 | 20 | | 30 | | 2.5 | o | o | 80 | 50 |
| OSITION | 1B | 10 | 40 | 20 | | 30 | | 2.5 | o | o | 70 | 50 |
| | 1c | 10 | 40 | 10 | 10 | 30 | | 2.5 | o | o | 70 | 50 |
| | 1D | 10 | 40 | 10 | | 30 | 10 | 2.5 | o | o | 80 | 50 |
| | 1E | | 50 | | 20 | 30 | | 2.5 | o | o | 80 | 50 |
| | 1F | 10 | 40 | | 20 | 30 | | 2.5 | o | o | 70 | 50 |
| | 1G | 10 | 40 | | 10 | 30 | 10 | 2.5 | o | o | 80 | 50 |
| | 1H | | 50 | 20 | | | 30 | 2.5 | o | o | 80 | 50 |
| | 1I | 10 | 40 | 20 | | | 30 | 2.5 | o | o | 70 | 50 |
| | 1J | | 50 | | 20 | 30 | | 2.5 | o | o | 80 | 50 |
| | 1K | 10 | 40 | | 20 | | 30 | 2.5 | o | o | 70 | 50 |

TABLE 2

| | | Component | | | | | | | | | | | | Additive | | Solvent | Film | Odor | $\alpha$ [%] | $\beta$ [%] |
|---|---|---|---|---|---|---|---|---|---|---|---|---|---|---|---|---|---|---|---|---|
| | | 1 | 2 | 5 | 6 | 7 | 8 | 9 | 10 | 11 | 12 | 13 | 14 | 15 | 16 | | | | |
| Amino group | | + | + | − | − | − | − | − | − | − | − | − | | | | | | | |
| HVD | | 3 | 2 | 3* | 3* | 3* | 3* | 2 | 3* | 3* | 3* | 2 | | | | | | | |
| COMP- | 2A | | 50 | 20 | | | | | | | | 30 | 0.75 | 0.15 | 2.5 | o | o | 80 | 50 |
| OSITION | 2B | 10 | 40 | 20 | | | | | | | | 30 | 0.75 | 0.15 | 2.5 | o | o | 70 | 50 |
| | 2C | 10 | 40 | 10 | 10 | | | | | | | 30 | 0.75 | 0.15 | 2.5 | o | o | 70 | 50 |
| | 2D | 10 | 40 | 10 | | 10 | | | | | | 30 | 0.75 | 0.15 | 2.5 | o | o | 70 | 50 |
| | 2E | 10 | 40 | 10 | | | 10 | | | | | 30 | 0.75 | 0.15 | 2.5 | o | o | 70 | 50 |
| | 2F | 10 | 40 | 10 | | | | | 10 | | | 30 | 0.75 | 0.15 | 2.5 | o | o | 70 | 50 |
| | 2G | 10 | 40 | 10 | | | | | | 10 | | 30 | 0.75 | 0.15 | 2.5 | o | o | 70 | 50 |
| | 2H | 10 | 40 | 10 | | | | | | | 10 | 30 | 0.75 | 0.15 | 2.5 | o | o | 70 | 50 |

TABLE 2-continued

| | | | | | Component | | | | | | | | | Additive | | Solvent | | | | α | β |
|---|---|---|---|---|---|---|---|---|---|---|---|---|---|---|---|---|---|---|---|---|---|
| | 1 | 2 | 5 | 6 | 7 | 8 | 9 | 10 | 11 | 12 | 13 | | 14 | 15 | | 16 | Film | Odor | | [%] | [%] |
| 2I | | 10 | 40 | 10 | | | | | | 10 | 30 | | 0.75 | 0.15 | | 2.5 | o | o | | 70 | 50 |

TABLE 3

| | | Component | | | | Additive | | Solvent | Film | Odor | α (%) | β (%) |
|---|---|---|---|---|---|---|---|---|---|---|---|---|
| | | 1 | 2 | 5 | 13 | 14 | 15 | 16 | | | | |
| Amino group | | + | + | − | − | | | | | | | |
| HVD | | 3 | 2 | 3* | 2 | | | | | | | |
| COMP-POSITION | 3A | 80 | | | 20 | 0.75 | 0.15 | 2.5 | o | o | 20 | 30 |
| | 3B | 60 | | | 40 | 0.75 | 0.15 | 2.5 | o | o | 40 | 60 |
| | 3C | 60 | 20 | | 20 | 0.75 | 0.15 | 2.5 | o | o | 40 | 80 |
| | 3D | 40 | | | 60 | 0.75 | 0.15 | 2.5 | o | o | 60 | 40 |
| | 3E | 40 | 40 | | 20 | 0.75 | 0.15 | 2.5 | o | o | 60 | 80 |
| | 3F | 40 | 20 | | 40 | 0.75 | 0.15 | 2.5 | o | o | 60 | 60 |
| | 3G | 40 | | 20 | 40 | 0.75 | 0.15 | 2.5 | o | o | 40 | 40 |
| | 3H | 20 | | | 80 | 0.75 | 0.15 | 2.5 | o | o | 80 | 20 |
| | 3I | 20 | 60 | | 20 | 0.75 | 0.15 | 2.5 | o | o | 80 | 80 |
| | 3J | 20 | 20 | | 60 | 0.75 | 0.15 | 2.5 | o | o | 80 | 40 |
| | 3K | 20 | | 20 | 60 | 0.75 | 0.15 | 2.5 | o | o | 60 | 20 |
| | 3L | 20 | 40 | | 40 | 0.75 | 0.15 | 2.5 | o | o | 80 | 60 |
| | 3M | | 20 | 60 | 20 | 0.75 | 0.15 | 2.5 | o | o | 40 | 20 |

TABLE 4

| | | Component | | | | Additive | | Solvent | Film | Odor | α (%) | β (%) |
|---|---|---|---|---|---|---|---|---|---|---|---|---|
| | | 1 | 2 | 5 | 9 | 14 | 15 | 16 | | | | |
| Amino group | | + | + | − | − | | | | | | | |
| HVD | | 3 | 2 | 3* | 2 | | | | | | | |
| COMP-POSITION | 4A | 80 | | | 20 | 0.75 | 0.15 | 2.5 | o | o | 20 | 80 |
| | 4B | 20 | 60 | | 20 | 0.75 | 0.15 | 2.5 | o | o | 80 | 80 |
| | 4C | | 20 | 60 | 20 | 0.75 | 0.15 | 2.5 | o | o | 40 | 20 |
| | 4D | | 20 | 20 | 60 | 0.75 | 0.15 | 2.5 | o | o | 80 | 20 |
| | 4E | 60 | | | 40 | 0.75 | 0.15 | 2.5 | o | o | 40 | 60 |
| | 4F | 40 | | | 60 | 0.75 | 0.15 | 2.5 | o | o | 60 | 40 |

TABLE 5

| | | Component | | | Additive | | Solvent | Film | Odor | α (%) | β (%) |
|---|---|---|---|---|---|---|---|---|---|---|---|
| | | 1 | 2 | 5 | 14 | 15 | 16 | | | | |
| Amino group | | + | + | − | | | | | | | |
| HVD | | 3 | 2 | 3* | | | | | | | |
| COMP-POSITION | 5A | 60 | 20 | 20 | 0.75 | 0.15 | 2.5 | o | o | 20 | 80 |
| | 5B | 10 | 70 | 20 | 0.75 | 0.15 | 2.5 | o | o | 70 | 80 |
| | 5C | 10 | 20 | 70 | 0.75 | 0.15 | 2.5 | o | o | 20 | 30 |
| | 5D | 10 | 40 | 50 | 0.75 | 0.15 | 2.5 | o | o | 40 | 50 |

TABLE 6

| | | Component | | | | | | Additive | | Solvent | Film | Odor | α (%) | β (%) |
|---|---|---|---|---|---|---|---|---|---|---|---|---|---|---|
| | | 4 | 3 | 1 | 2 | 13 | 6 | 14 | 15 | 16 | | | | |
| Amino group | | + | + | + | − | − | − | | | | | | | |
| HVD | | 3 | 3 | 3 | 2 | 2 | 3* | | | | | | | |
| COMP-POSITION | 6A | 50 | | | | 30 | 20 | 0.75 | 0.15 | 2.5 | o | o | 30 | 50 |
| | 6B | 10 | | | 40 | 30 | 20 | 0.75 | 0.15 | 2.5 | o | o | 70 | 50 |
| | 6C | | 50 | | | 30 | 20 | 0.75 | 0.15 | 2.5 | o | o | 30 | 50 |
| | 6D | | 10 | | 40 | 30 | 20 | 0.75 | 0.15 | 2.5 | o | o | 70 | 50 |

TABLE 7

| | | Component | | | | | Additive | | Solvent | Film | Odor | α (%) | β (%) |
|---|---|---|---|---|---|---|---|---|---|---|---|---|---|
| | | 1 | 2 | 5 | 9 | 13 | 14 | 15 | 16 | | | | |
| Amino group | | + | + | − | − | − | | | | | | | |
| HVD | | 3 | 2 | 3* | 2 | 2 | | | | | | | |
| COMP-POSITION | 10A | 10 | 40 | | 20 | 30 | 0.75 | 0.15 | 2.5 | X | X | 90 | 50 |
| | 10B | 10 | | 70 | | 20 | 0.75 | 0.15 | 2.5 | X | X | 20 | 10 |
| | 10C | 70 | 10 | 20 | | | 0.75 | 0.15 | 2.5 | X | X | 20 | 80 |
| | 10D | 30 | 10 | 60 | | | 0.75 | 0.15 | 2.5 | X | X | 10 | 40 |

TABLE 7-continued

| | Component | | | | | Additive | | Solvent | | | α | β |
| --- | --- | --- | --- | --- | --- | --- | --- | --- | --- | --- | --- | --- |
| | 1 | 2 | 5 | 9 | 13 | 14 | 15 | 16 | Film | Odor | (%) | (%) |
| 10E | 10 | | | | 90 | 0.75 | 0.15 | 2.5 | X | X | 90 | 10 |
| 10F | 10 | | 50 | | 40 | 0.75 | 0.15 | 2.5 | X | X | 40 | 10 |
| 10G | 20 | 80 | | | | 0.75 | 0.15 | 2.5 | X | X | 80 | 100 |
| 10H | 60 | 40 | | | | 0.75 | 0.15 | 2.5 | X | X | 40 | 100 |

That which is claimed is:

1. An odor-resistant film-forming composition comprising a mixture of silicon compounds of a first type having an amino group and a plurality of hydrolyzable groups in the molecule, and silicon compounds of a second type which are free of amino groups but which have a plurality of hydrolyzable groups in the molecule;

and containing a mixture of silicon compounds containing two hydrolyzable groups and silicon compounds containing three or more hydrolyzable groups;

the proportion of the silicon compounds of either the first or second type of silicon compounds having two hydrolyzable groups being 20–90% by weight of the total of the silicon compounds having three or more hydrolyzable groups in the molecule;

the silicon compounds of the second type being selected from the group consisting of:

(a) a siloxane resin containing an $R^0_{(3-m)}R^1_m SiO_{\frac{1}{2}}$ unit, an $R^0_{(2-n)}R^1_n SiO_{2/2}$ unit, wherein m represents 1, 2 or 3 and n represents 1 or 2, and an $R^0_{(1-p)}R^1_p SiO_{3/2}$ unit wherein p represents 0 or 1, provided that $R^0$ is a hydrolyzable group, $R^1$ is a methyl or phenyl group, and the siloxane resin has a plurality of hydrolyzable groups in the molecule; and (b) a silicate.

2. An odor-resistant film-forming composition according to claim 1 wherein the silicon compounds of the first type are selected from the group consisting of γ-(2-aminoethyl)aminopropyltrimethoxysilane, γ-(2-aminoethyl)aminopropylmethyldimethyoxysilane, 3-aminopropyltriethoxysilane, and N-[(3-trimethoxysilyl)-propyl]diethylenetriamine.

3. A method of preventing the migration and penetration of odors into a substrate comprising applying to a surface of the substrate the composition defined in claim 1 in the form of a film.

4. A method according to claim 3 in which the film is cured.

5. A method according to claim 4 in which odors are removed from the surface of the film by washing the cured film with water.

* * * * *